United States Patent
Fukuwa

(10) Patent No.: US 7,055,950 B2
(45) Date of Patent: Jun. 6, 2006

(54) ATTACHABLE SPECTACLE ACCESSORY MOUNTING DEVICE AND AN ATTACHABLE SPECTACLE ACCESSORY

(75) Inventor: Yasuo Fukuwa, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/438,972

(22) Filed: May 16, 2003

(65) Prior Publication Data

US 2003/0223031 A1   Dec. 4, 2003

(30) Foreign Application Priority Data

May 28, 2002 (JP) ........................ P2002-153789

(51) Int. Cl.
*G02C 9/00* (2006.01)
(52) U.S. Cl. .......................... 351/47; 351/57
(58) Field of Classification Search ................ 351/47, 351/57, 44, 41
See application file for complete search history.

(56) References Cited

U.S. PATENT DOCUMENTS

| | | | |
|---|---|---|---|
| 4,196,981 | A | 4/1980 | Waldrop |
| 5,568,207 | A | 10/1996 | Chao |
| 5,642,177 | A | 6/1997 | Nishioka |
| 5,737,054 | A * | 4/1998 | Chao ........................ 351/47 |
| 5,980,036 | A | 11/1999 | Solomon |
| 6,012,811 | A | 1/2000 | Chao et al. |
| 6,092,896 | A | 7/2000 | Chao et al. |
| 6,109,747 | A * | 8/2000 | Chao ........................ 351/47 |
| 6,116,730 | A | 9/2000 | Kwok |
| 6,139,141 | A | 10/2000 | Zider |
| 6,149,269 | A | 11/2000 | Madison |
| 6,231,179 | B1 | 5/2001 | Lee |
| RE37,545 | E | 2/2002 | Chao |
| 6,367,926 | B1 | 4/2002 | Chao et al. |
| 6,375,321 | B1 | 4/2002 | Lee et al. |
| 6,488,372 | B1 | 12/2002 | Park |
| 6,550,913 | B1 * | 4/2003 | Zelman ................... 351/57 |

FOREIGN PATENT DOCUMENTS

| | | |
|---|---|---|
| CH | 572222 | 1/1976 |
| DE | 85077615 | 5/1985 |
| DE | 88068986 | 10/1988 |
| DE | 3905041 | 8/1990 |
| DE | 3919489 | 12/1990 |
| DE | 3920879 | 1/1991 |
| DE | 39219879 | 1/1991 |
| DE | 39333108 | 1/1991 |
| FR | 1061253 | 4/1954 |
| JP | 9-101489 | 4/1997 |

(Continued)

OTHER PUBLICATIONS

English Language Translatio of German Appln. No. 88 06 898.6.

(Continued)

*Primary Examiner*—Hung Xuan Dang
(74) *Attorney, Agent, or Firm*—Greenblum & Bernstein, P.L.C.

(57) ABSTRACT

Spectacles comprise endpieces provided with receiving portions. Attachable spectacle accessory comprises endpieces provided with connecting portions. The receiving portions have a surface which is substantially perpendicular to the surface of the lenses of the spectacles. A magnet is set in the receiving portion. The connecting portions have a surface which is attracted to the surface of the receiving portion. The connecting portion is made from a magnetic substance. The Attachable spectacle accessory is securely attached to the spectacles by magnetically attracting the receiving portions and the connecting portions with each other.

19 Claims, 5 Drawing Sheets

FOREIGN PATENT DOCUMENTS

| | | |
|---|---|---|
| JP | 10186292 | 7/1998 |
| WO | 9009611 | 8/1990 |

OTHER PUBLICATIONS

English Language Abstract of German Appln. No. 39 33 310.8.
English Language Abstract of German Appln. No. 39 21 987.9.
English Language Abstract of German Appln. No. 39 20 879.
English Language Abstract of German Appln. No. 39 19 489.
English Language Abstract of German Appln. No. 39 05 041.
English Language Translation of German Appln. No. 85 07 761.5.
English Language Abstract of Swiss Appln. No. 572,222.
English Language Translation of French Appln. No. 1,061,253.
"New Product Announcement Supporting Material: Questions and Answers of Pentax Magnet Eyeglass Frame", Sep. 26, 1995, along with an English Language Translation (distributed during Oct. 3-5, 1995 at the International Optical Fair in Tokyo, Japan).
"Easy Clip The New Magnetic Clip-On System" of Pentax, date unknown.
Documents describing Twincome in a Patent Opposition Proceeding in Germany initiated by PENTAX, on or around Apr. 30, 1997.
"Contour Optik" from www.contour-optik.com, and which appears to have been obtained from the Internet on Jan. 8, 1999.

* cited by examiner

ATTACHABLE SPECTACLE ACCESSORY MOUNTING DEVICE AND AN ATTACHABLE SPECTACLE ACCESSORY

BACKGROUND OF THE INVENTION

1. Field of the Invention

The present invention relates to an attachable spectacle accessory mounting device for attaching an attachable spectacle accessory to spectacles.

2. Description of the Related Art

Conventionally, an attachable spectacle accessory is attached to spectacles using magnetic power. As shown in Japanese Unexamined Patent Publication (KOKAI) NO. 09-101489, the spectacles and the spectacle accessory have endpieces which are provided with attractive portions formed from a permanent magnet or magnetic material. The attractive portions of the spectacle accessory are attracted to the attractive portions of the spectacles by magnetic power, so that the spectacle accessory is attached to the spectacles. But in this structure the spectacles and the spectacle accessory have many parts so that it is not easy to fabricate.

Namely, it is preferable that the spectacles for attaching a spectacle accessory have the same structure as that of ordinary glasses in order to decrease the number of parts. Therefore, it is suggested that spectacles should be provided with a bridge made of a magnetic material, and the spectacle accessory should be provided with a connecting member which bridges a pair of the lenses, and the connecting member which has a magnet should be attached to the bridge of the spectacles by magnetic power. But in this structure, the magnet may not be connected to a predetermined place on the bridge, because the magnet is attracted to anyplace on the bridge. Further, undesirably the spectacle accessory can easily come off the spectacles, if the spectacles are pushed slightly because the spectacle accessory is not securely attached to the spectacles.

SUMMARY OF THE INVENTION

Therefore, an object of the present invention is to provide a spectacle accessory mounting device for spectacles, so that the spectacle accessory is easily attached to and taken off the spectacles, the spectacles accessory is attached securely to the spectacles, and the numbers of parts and complexity of the spectacles is reduced.

According to the present invention, there is a spectacle accessory mounting device for attaching a spectacle accessory to spectacles which have a pair of first lenses, and a bridge, made of a magnetic material, which couples the pair of first lenses. A connecting member, provided on the spectacle accessory, has a connecting surface which is connected to the bridge by magnetic power, and a positioning portion being engaged with a pair of rim elements of the first lenses when the spectacle accessory is attached to the spectacles.

The spectacle accessory comprises a pair of second lenses, and the connecting member which couples the pair of second lenses. The positioning portion projects toward the bridge when the spectacle accessory is being attached to the spectacles.

The bridge has an upper surface, which is substantially horizontal when the spectacles are used, and the positioning portion contacts the upper surface. Preferably the positioning portion, formed as one body, is the same length as that of the upper surface.

Preferably the positioning portion comprises a first tongue engaged with one of the rim elements and a second tongue engaged with another of the rim elements.

The positioning portion is connected to the bridge by magnetic power. Further, the connecting member has a permanent magnet.

The permanent magnet has an exposed surface, the exposed surface is exposed at, and is substantially flush with, the connecting surface.

The connecting surface, which is a back surface of the connecting member, is connected to a front surface of the bridge.

The bridge has a bottom surface, which is substantially horizontal when the spectacles are used. The connecting member has a third tongue which contacts the bottom surface and prevents the spectacle accessory from slipping off of the spectacles when the spectacle accessory is attached to the spectacles.

According to the present invention, spectacles comprise a pair of lenses and a bridge which couples the pair of lenses. The bridge is made of a magnetic material.

According to the present invention, a spectacle accessory comprises a connecting member. The connecting member has a connecting surface which is connected to a bridge, made of a magnetic material, of the spectacles by magnetic power, and a positioning portion (or portions) being engaged with a pair of rims elements of the lenses of the spectacles when the spectacle accessory is attached to the spectacles.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
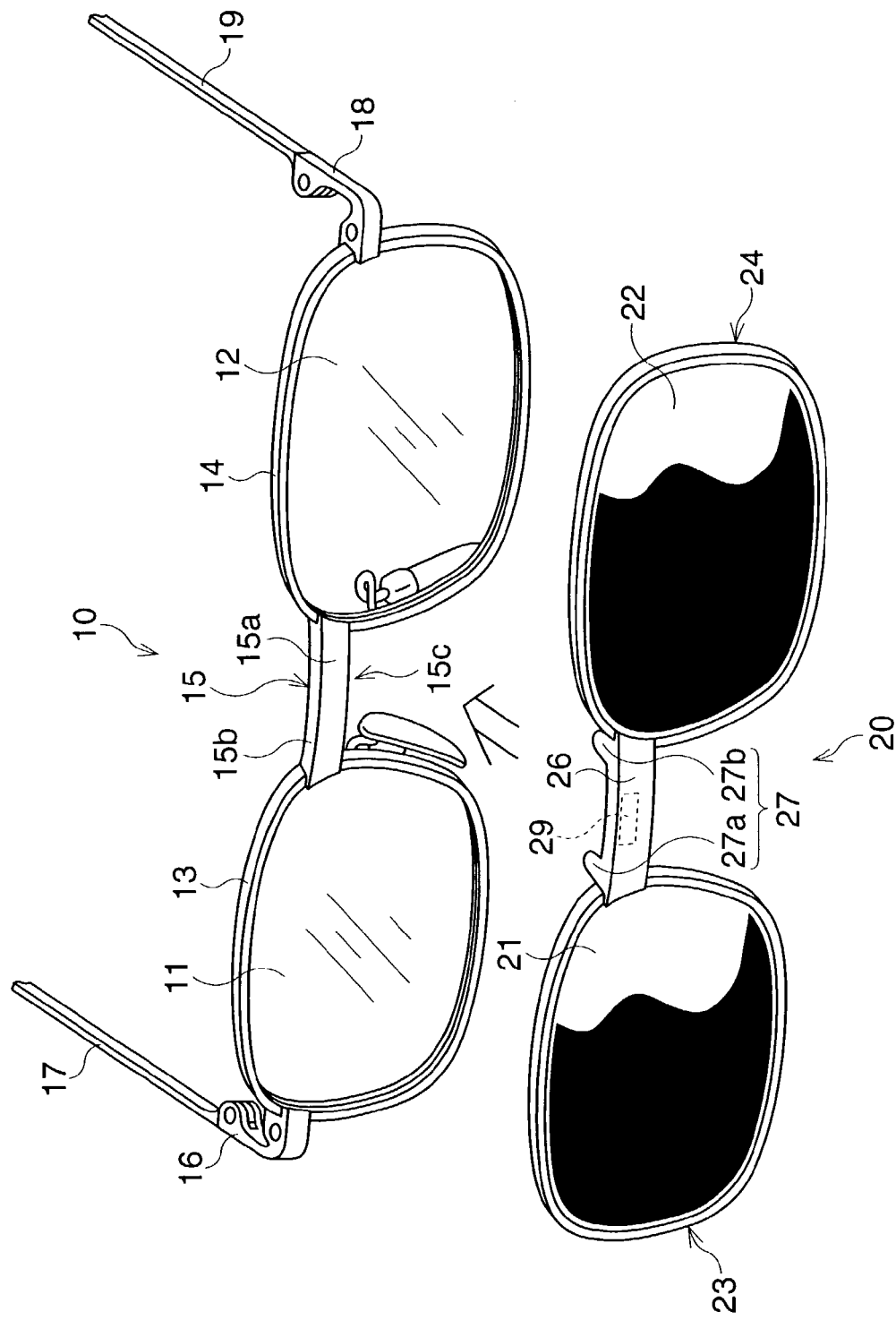
FIG. 1 is a perspective view of spectacles and a spectacle accessory of the first embodiment.

The present invention will be described below with reference to the embodiments shown in the drawings.

FIG. 1 is a perspective view of spectacles 10 and sunglasses (an attachable spectacle accessory) 20 of the first embodiment. The spectacles 10 have a pair of lenses 11, 12. The lenses 11, 12 are each held by frames (or rim elements) 13, 14. The rim elements 13, 14 are connected by a bridge 15. In the case of the framed glasses, the frames are the rim elements, and in the case of frameless glasses, the outer peripheries of the lenses are the rim elements. The rim element 13 is connected to a temple 17 through an endpiece 16. The rim element 14 is connected to a temple 19 through an endpiece 18. The bridge 15, which is made of magnetic material, has a front surface 15a, an upper surface 15b and a bottom surface 15c. When the spectacles 10 are used, the front surface 15a is substantially perpendicular, and the upper surface 15b and the bottom surface 15c are substantially horizontal. Namely, the spectacles 10 are glasses which have an ordinary structure which is used conventionally except that the bridge 15 is made of magnetic material.

The spectacle accessory 20 has a pair of colored lenses 21, 22. The lenses 21, 22 are each held by the frames (or rim elements) 23, 24. The rim elements 23, 24 are bridged by a connecting member 26. The connecting member 26 corresponds to the position of the bridge 15 of the spectacles 10 when the spectacle accessory 20 is attached to the spectacles 10.

Figure 2:
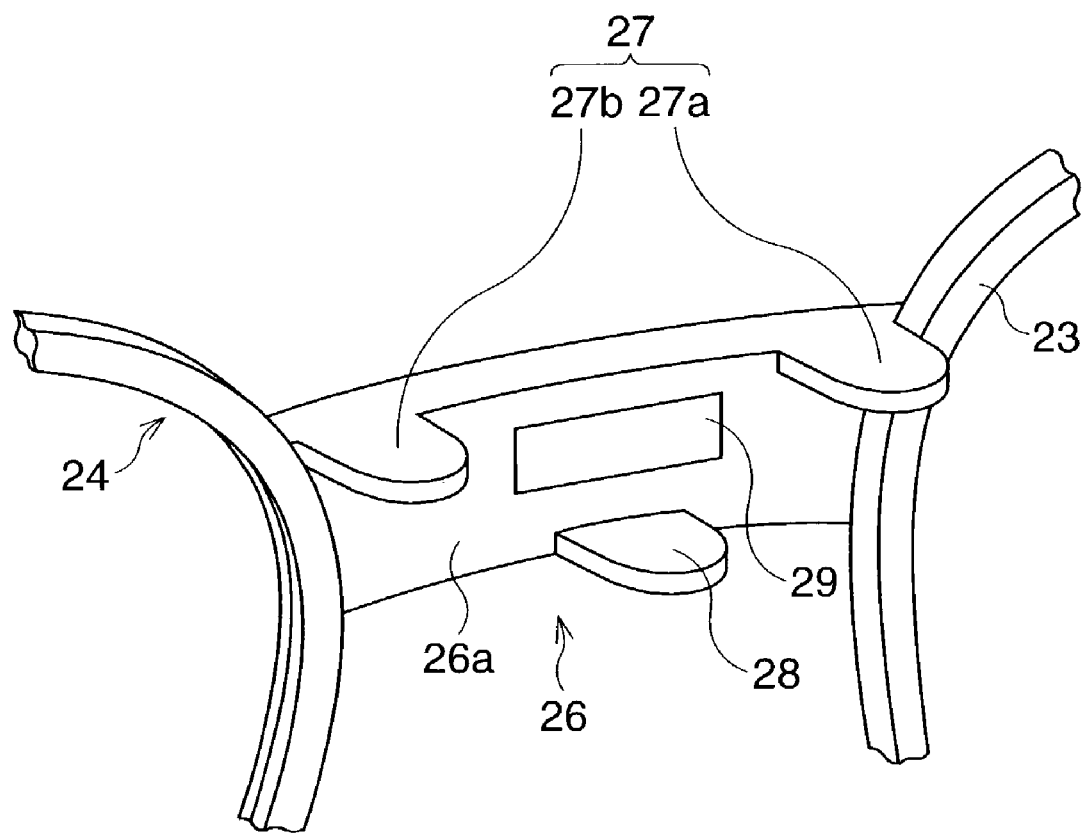
FIG. 2 is a perspective view of a connecting member of the spectacle accessory of the first embodiment.
Figure 3:
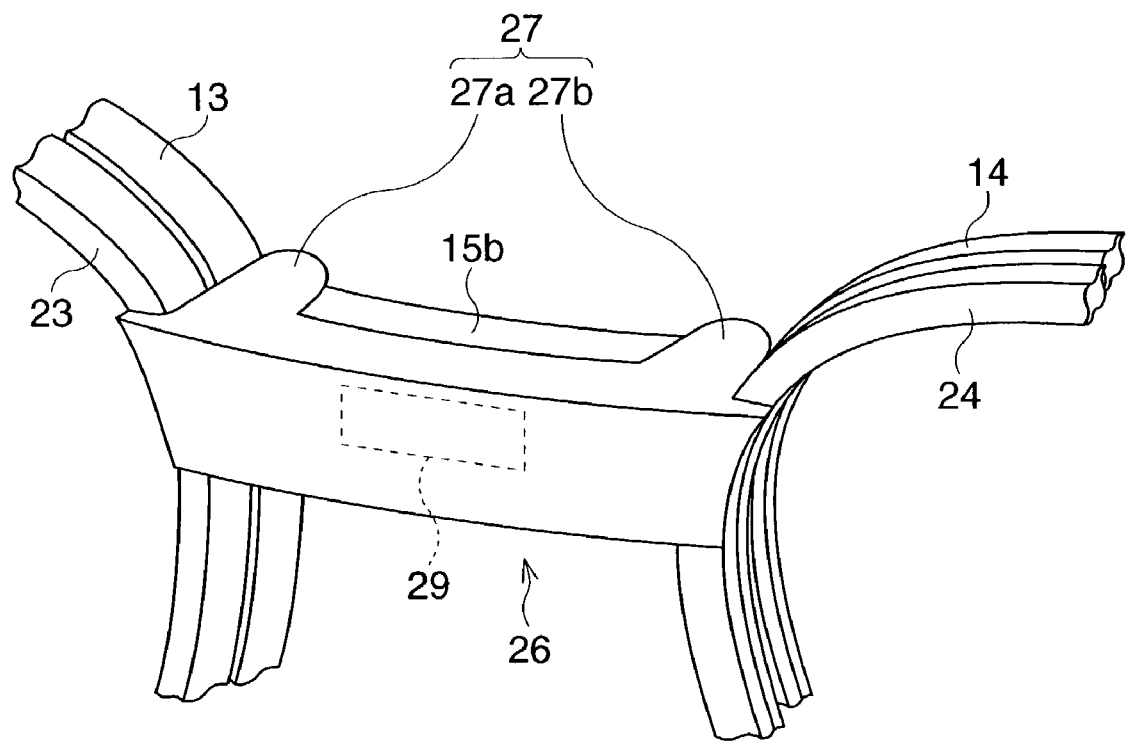
FIG. 3 is a perspective view of the connecting member connected to abridge of the spectacles in the first embodiment.

FIG. 2 is a back view which shows the connecting member 26 and FIG. 3 is a front view which shows the connecting member 26 connected to the bridge 15 in the first embodiment. The connecting member 26 has a connecting surface 26a. The connecting surface 26a, which is a back surface of the connecting member 26, is connected to a front surface 15a of the bridge 15. The connecting member 26 has a permanent magnet 29. The permanent magnet 29 has an exposed surface which is exposed at, and is substantially flush with, the connecting surface 26a. The exposed surface of the permanent magnet 29 is provided at substantially the center of the connecting surface 26a. Further, the exposed surface of the permanent magnet 29 is covered by a resin layer which has a thickness of about 0.3 mm in order to protect the permanent magnet 29 from scratches.

The connecting member 26 is provided with a positioning portion 27 which is composed of a first tongue 27a and a second tongue 27b on the upper side of the connecting member 26. The first tongue 27a and the second tongue 27b project toward the bridge 15 and contact the upper surface 15b, and further the first tongue 27a is engaged with the rim element 13 of the lens 11 and the second tongue 27b is engaged with the rim element 14 of the lens 12, when the spectacle accessory 20 is attached to the spectacles 10.

The connecting member 26 is provided with a third tongue 28 on the bottom side of the connecting member 26. The third tongue 28 contacts the bottom surface 15c of the bridge 15 in order to prevent the spectacle accessory 20 from slipping off of the spectacles 10 when the spectacle accessory 20 is attached to the spectacles 10.

In this embodiment, if the connecting surface 26a of spectacle accessory 20 is only brought near the front surface 15a of the bridge 15, the connecting surface 26a attracts the bridge 15 magnetically, and then the spectacle accessory 20 is attached to the spectacles 10. At this time, the connecting member 26 is connected to the predetermined position of the bridge 15 because the positioning portion 27 is engaged with a pair of the rim elements 13, 14. Due to this, the spectacle accessory 20 is attached to spectacles 10 in the same state at all times. Further, if the spectacle accessory 20 is pushed, the spectacle accessory does not slip off of the spectacles 10, because the three tongues 27a, 27b and 28 contact both surfaces 15b, 15c of the upper and bottom sections of the bridge 15.

On the other hand, the spectacle accessory 20 is easily taken off the spectacles 10 merely by pulling the spectacle accessory 20 against the magnetic power.

Figure 4:
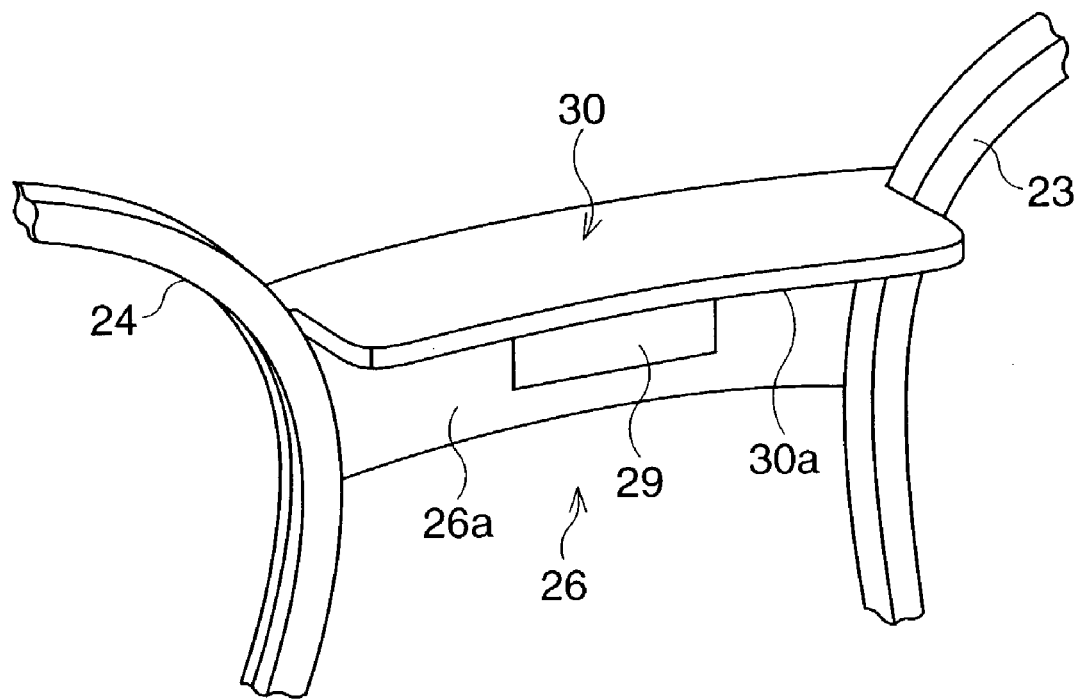
FIG. 4 is a perspective view of a connecting member of the spectacle accessory of the second embodiment.

FIG. 4 is a back view which shows a connecting member of a spectacle accessory of a second embodiment. The spectacle accessory mounting device of the second embodiment has the same structure as that of the first embodiment except that the positioning portion is formed as one body and the third tongue is not provided on the connecting member. Namely, as shown in FIG. 4 the connecting member 26 is provided with an integral positioning portion 30 on the upper side of the connecting member 26. The positioning portion 30 is substantially the same length as that of the upper surface 15b of the bridge 15. The positioning portion 30, has a contact surface 30a which contacts the upper surface 15b of the bridge 15, and is engaged with the pair of the rim elements 13, 14, when the spectacle accessory 20 is attached to the spectacles 10. The spectacle accessory mounting device in this embodiment has a similar effect as that of the first embodiment even though it does not have the third tongue 28, because the contact surface 30a is broader in this embodiment than in the first embodiment.

Figure 5:
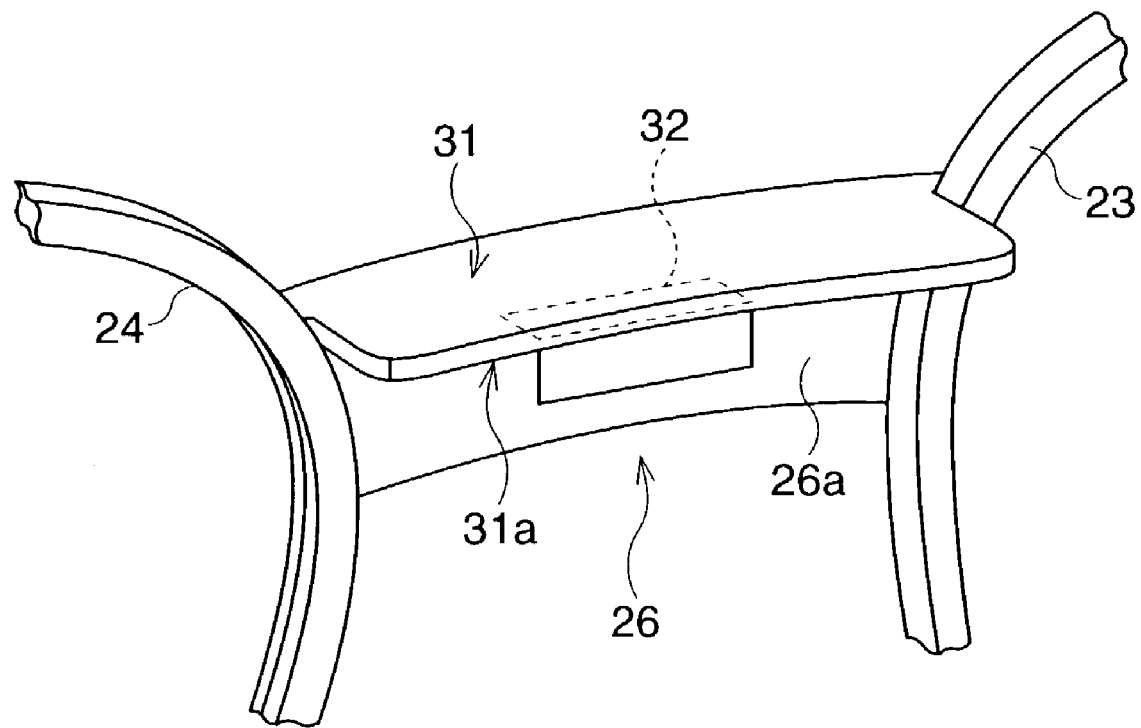
FIG. 5 is a perspective view of a connecting member of the spectacle accessory of the third embodiment.

FIG. 5 is a back view which shows a connecting member of a spectacle accessory of a third embodiment. The spectacle accessory mounting device of the third embodiment has the same structure as that of the second embodiment except that the bridge 15 is also attracted to the positioning portion magnetically, namely the positioning portion 31 has a permanent magnet 32. The permanent magnet 32 has an exposed surface which is exposed at, and is substantially flush with, the contact surface 31a which contacts the upper surface 15b of the bridge 15. The exposed surface of the permanent magnet 32 is provided at almost the center of the contact surface 31a. The spectacle accessory 20 is connected to the spectacles 10 more strongly in this embodiment than in the second embodiment because the bridge 15 is attracted by two magnets.

In the first, second, and third embodiments, it is easy to fabricate the spectacles 10, because spectacles needn't be provided with a special structure for attaching the spectacle accessory 20, except that the bridge is made of a magnetic material. Further, the spectacle accessory 20 is merely made of lenses, frames (if necessary) and a connecting member so that a lot of parts for fabricating the spectacle accessory 20 are not needed.

In the first, second, and third embodiments, the lenses of the spectacle accessory are colored lenses. However, positive lenses can be used as lenses for the spectacle accessory according to the present invention. Spectacles including negative lenses are used as glasses for presbyopia by combining a spectacle accessory having positive lenses.

Further, in the first, second, and third embodiments, spectacles have frames for holding the lenses. However, spectacles can have no frames for holding the lenses of the spectacles. If the spectacles do not have a frame, the positioning portion is engaged with a pair of lenses rims (rim elements) directly.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-153789 (filed on May 28, 2002) which is expressly incorporated herein, by reference, in its entirety.

The invention claimed is:

1. An attachable spectacle accessory mounting device for attaching an attachable spectacle accessory to spectacles which have a pair of first lenses, comprising:
 a bridge which couples said pair of first lenses and which is made of a magnetic material; and
 a connecting member provided on said attachable spectacle accessory, said connecting member having a connecting surface which is connected to said bridge by magnetic power, and a positioning portion projecting directly rearwardly from the connecting surface, and being engaged with a pair of rim elements of said first lenses when said attachable spectacle accessory is attached to said spectacles, wherein, when said spectacle accessory is attached to said spectacles, said connecting surface engages a front surface of said bridge and said positioning portion engages a top surface of said bridge.

2. A device according to claim 1, wherein said attachable spectacle accessory comprises a pair of second lenses, and said connecting member couples said pair of second lenses.

3. A device according to claim 1, wherein said positioning portion projects toward said bridge when said attachable spectacle accessory is attached to said spectacles.

4. A device according to claim 1, wherein said bridge has an upper surface, which is substantially horizontal when said spectacles are used, and said positioning portion contacts said upper surface.

5. A device according to claim 4, wherein said positioning portion, formed as one body, is substantially the same length as that of said upper surface.

6. A device according to claim 1, wherein said positioning portion comprises a first tongue engaged with one of said rim elements and a second tongue engaged with another of said rim elements.

7. A device according to claim 1, wherein said positioning portion is connected to said bridge by magnetic power.

8. A device according to claim 1, wherein said connecting member has a permanent magnet.

9. A device according to claim 8, wherein said permanent magnet has an exposed surface, said exposed surface is exposed at, and is substantially flush with, said connecting surface.

10. A device according to claim 1, wherein said connecting surface, which is a back surface of said connecting member, is connected to a front surface of said bridge.

11. The attachable spectacle accessory mounting device according to claim 1, wherein said connecting surface and said positioning portion are configured such that the spectacle accessory is mountable to the spectacles without requiring a pivotal movement of the spectacle accessory.

12. The attachable spectacle accessory mounting device according to claim 1, wherein said connecting surface and said projecting portion are configured to enable mounting of the spectacle accessory to the spectacles by horizontal movement of the spectacle accessory with respect to the spectacles.

13. The attachable spectacle accessory mounting device according to claim 1, said connecting member configured to prevent detaching of the spectacle accessory from the spectacles in response to an exertion of a force from above on the spectacle accessory.

14. An attachable spectacle accessory comprising:
a connecting member having;
  a connecting surface which is connected to a bridge made of a magnetic material, of spectacles by magnetic power, and
  a positioning portion projecting directly rearwardly from the connecting surface and being engaged with a pair of rim elements of lenses of said spectacles when said attachable spectacle accessory is attached to said spectacles, wherein, when the spectacle accessory is attached to said spectacles, said connecting surface engages a front surface of said bridge and said positioning portion engages a top surface of said bridge.

15. A device according to claim 14, wherein said bridge has a bottom surface, which is substantially horizontal when said spectacles are used, said connecting member having a third tongue which contacts said bottom surface and prevents said attachable spectacle accessory from slipping off of said spectacles when said attachable spectacle accessory is attached to said spectacles.

16. The attachable spectacle accessory mounting device according to claim 14, wherein said connecting surface and said positioning portion are configured such that the spectacle accessory is mountable to the spectacles without requiring a pivotal movement of the spectacle accessory.

17. The attachable spectacle accessory mounting device according to claim 14, wherein said connecting surface and said projecting portion are configured to enable mounting of the spectacle accessory to the spectacles by horizontal movement of the spectacle accessory with respect to the spectacles.

18. The attachable spectacle accessory mounting device according to claim 14, said connecting member configured to prevent detaching of the spectacle accessory from the spectacles in response to an exertion of a force from above on the spectacle accessory.

19. An attachable spectacle accessory mounting device for attaching an attachable spectacle accessory to spectacles which have a pair of first lenses, the accessory mounting device comprising:
a bridge which couples said pair of first lenses and which is configured to include a magnetic material; and
a connecting member provided on said attachable spectacle accessory, said connecting member having a connecting surface which is connected to said bridge by magnetic force, and a positioning portion that extends directly rearwardly and is engaged with a pair of rim elements of said first lenses when said attachable spectacle accessory is attached to the spectacles the bridge having an upper surface which is substantially horizontal when said spectacles are used and said positioning portion contacts said upper surface of said bridge, wherein, when the spectacle accessory is attached to said spectacles, said connecting surface engages a front surface of said bridge and said positioning portion engages a top surface of said bridge.

* * * * *